United States Patent [19]
Gagel et al.

[11] Patent Number: 5,738,811
[45] Date of Patent: Apr. 14, 1998

[54] PROCESS FOR MAKING FUSED-CAST REFRACTORY PRODUCTS

[75] Inventors: Joseph D. Gagel; William C. Parisi, both of Jamestown, N.Y.; Dean M. Thomas, Russell, Pa.

[73] Assignee: Monofrax Inc., Falconer, N.Y.

[21] Appl. No.: 441,901

[22] Filed: May 16, 1995

[51] Int. Cl.$^6$ ................................................ C04B 35/653
[52] U.S. Cl. ............................................. 264/82; 264/430
[58] Field of Search ........................... 264/82, 430, 265

[56] References Cited

U.S. PATENT DOCUMENTS

| | | | |
|---|---|---|---|
| 3,079,452 | 2/1963 | Sorgues | 373/62 |
| 3,541,193 | 11/1970 | Adams | 264/66 |
| 3,670,061 | 6/1972 | Nakayana | 264/82 |
| 3,703,391 | 11/1972 | Clishem et al. | 501/105 |
| 3,868,241 | 2/1975 | Felice et al. | 65/135.7 |
| 4,304,954 | 12/1981 | Cichy | 373/84 |
| 4,417,723 | 11/1983 | Kitamura | 266/265 |
| 4,943,398 | 7/1990 | Endo | 264/82 |
| 4,992,396 | 2/1991 | McGarry et al. | 501/107 |
| 5,171,491 | 12/1992 | Kim | 264/430 |
| 5,329,545 | 7/1994 | Dudill | 266/265 |

FOREIGN PATENT DOCUMENTS

| | | |
|---|---|---|
| 1208577 | 2/1960 | France . |
| 1036893 | 7/1966 | United Kingdom . |

*Primary Examiner*—Timothy Speer
*Attorney, Agent, or Firm*—Renner, Kenner, Greive, Bobak, Taylor & Weber

[57] ABSTRACT

The melt produced in a furnace during the course of making a fused-cast refractory product is effectively treated with a beneficiating gas by injecting the gas in a substantially continuous manner through a tuyere extended beneath the surface of the melt throughout a production campaign and supporting the gas injection between campaigns.

18 Claims, 2 Drawing Sheets

PROCESS FOR MAKING FUSED-CAST REFRACTORY PRODUCTS

This invention is in the field of processes for making refractory products; more specifically, it relates to the fusion-casting process for making refractories, especially processes in which the molten charge is treated with a beneficiating agent.

BACKGROUND

Refractory products, such as bricks, blocks, and various shapes, can be made in several ways from ceramic materials. For example, ceramic materials can be processed by sintering at high temperatures, or the materials can be bonded together via matrix phases. Alternatively, in the fusion-casting process, the ceramic materials are first melted, poured into molds of the desired size and shape, and the refractory bodies are recovered from the molds after cooling. Ceramic materials suitable for fused-cast products include oxides such as, for example, silica, alumina, zirconia, calcia, chromia, magnesia, alkali metal oxides, as well as chrome ores, zircon, and mixtures thereof.

In making fused-cast refractories, it has been the practice in the industry to melt the ceramic materials in electric arc furnaces, but other methods of melting may be employed. In the electric arc process the arc is struck between the electrodes and the melt. The electrodes are operated in or above the surface of the melt which is contained in an open top or covered crucible or ladle having walls to contain the ceramic material and equipped with a pouring spout.

Fused-cast refractories have several applications, a very important one being in the glass industry, where such refractories are employed as the lining and/or structural material for the furnaces and tanks containing the molten glass.

In the manufacture of glass, interactions between the refractory lining and the molten glass can lead to bubbles, stones and other defects in the glass. In addition, the exudation of a separate glassy phase from the refractory into the glass melt can cause further contamination of the melt, and even premature failure of the refractory.

Efforts to minimize chemical reactions between the refractory material and the melt have continued for decades. As long ago as 1960 it was disclosed in French Patent 1,208,577 that the adverse effects listed above are promoted by both excessive porosity in the fused-cast refractory body and by a chemical reduction of the oxide melt by graphite, the commonly employed electrode for arc melting. It was further disclosed that the properties of the fused-cast refractory product can be improved by striking the arc such that the electrodes are separated from the melt and the arc length between the electrodes and the melt increased. This is referred to as the "high arc process." The high arc minimizes reduction of the oxides in the melt by carbon or carbon monoxide from the electrodes. The arc passing through the melt provides stirring at the surface, decreasing the porosity in the refractory product. The '577 patent broadly discloses that agitation can also be provided by passing a stream of an oxidizing gas, such as air or oxygen, through the melt.

Further along this line, U.S. Pat. No. 3,079,452, having the same assignee as the aforesaid '577 patent, discloses the advantageous renewal of the gaseous atmosphere above the oxide melt with a stream of air to rid that atmosphere of carbon monoxide produced by reaction between the melt and the graphite electrodes. The air can be introduced by providing the crucible with air orifices or vents, such as the tapping hole. British Patent 1,036,893, with the same assignee, briefly describes a crucible in which air is introduced beneath the surface of the melt, the melt being heated by means other than that described in the aforesaid '577 patent. U.S. Pat. No. 3,670,061 discloses that dry argon, nitrogen or carbon dioxide gas, introduced through hollow electrodes used to heat the melt, also improves the product properties.

U.S. Pat. No. 3,703,391 refers to a method for introducing an oxidizing gas into the melt by inserting a water-cooled metal lance pressurized with the gas. This general technique has been adopted by and is still used by a number of manufacturers of fused-cast refractories, the lance generally being inserted into the melt and then removed prior to pouring. However, use of such a water-cooled lance introduces an element of danger into the process, because if a seal should break, or a weld should crack, or other water cooling system failure occur, an explosion due to rapid vaporization of water leaking into the melt at 2000° C. or so would occur.

Therefore, elaborate testing, retesting and safety checks must be carried out if the conventional lance technique is used. The '391 patent addresses these problems by providing a water-cooled gas injection mini-lance which is removably engaged with the tap in the crucible and is used to inject gas into the melt only during the time in which the crucible is tilted after the melt is formed but before it is poured. On another tack, U.S. Pat. No. 3,868,241 avoids the problems associated with injecting an oxidizing gas directly into the melt by contacting the melt with an oxidizing gas only as it is being poured into molds.

In carrying out a typical production campaign to make a fused-cast refractory, the walled crucible is loaded with ceramic materials, the electric arc is struck, melting the materials, the melt is poured from the crucible into molds or other shaping devices, the crucible is reloaded with ceramic materials, the fresh materials are melted, poured into molds, etc. A production campaign for a fused-cast refractory typically runs for days or weeks and is, in essence, a batch process carried out repetitively. At the end of a production campaign the electric power typically is decreased or turned off, whereupon in either case a substantial amount of the residual melted ceramic material solidifies in the crucible. The next campaign typically is initiated by again striking the electric arc, remelting the ceramic residue from the last campaign, etc.

SUMMARY OF THE INVENTION

The aforesaid improvements in the technique for treating the fusion-cast melt with a beneficiating gas fail to address the fact that harmful oxide reduction reactions may continue in the melt throughout its life. In the prior art, treatment with the beneficiating gas and agitation of the melt generally are not continuous throughout a single batch.

The discontinuous nature of the gas treatment has made it seem desirable to some of those skilled in the art to treat the melt vigorously with a large amount of gas just before the melt is poured, but this can lead to excessive porosity in the fused-cast product. It is now the state of the art to compensate for this by introducing an electric power-off delay between the time the gas treatment ends and the melt is poured to enable the gas bubbles to escape from the melt. However, with stirring disrupted, the denser components of the melt tend to settle to the bottom of the crucible, leading to a nonuniform fused-cast product.

Thus, it is one objective of this invention to correct these deficiencies in the prior art. It is another objective of this invention to treat the fusion-cast melt with a beneficiating agent without using a water-cooled gas insertion device, thereby avoiding the dangers and expense associated with a water-cooled lance. Other objectives will become apparent hereinafter.

In attaining these objectives, this invention provides an improvement in the fusion-casting process which includes treating the melted ceramic material in a substantially continuous manner with a beneficiating gas throughout a single or multi-batch production campaign, as well as supporting the gas treatment between campaigns.

In preferred embodiments, the beneficiating gas is an oxidizing agent, and the gas is delivered into the melt by means of one or more tuyeres which extend into the crucible beneath the surface of the melt. In addition to constant protection against reducing agents, this practice provides continuous, controllable stirring of the melt throughout each batch, including the pouring step. With this invention, the electric arc can be (but need not be) continuously energized, even during the melt pouring steps, thereby maintaining the melt at a relatively uniform temperature. The arc also augments the stirring provided by the injected gas.

Stirring improves the chemical and temperature homogeneity of the melt and significantly reduces the amount of sedimentation by the denser components to the bottom of the melt pool during a campaign, resulting in reduced composition and temperature variability within the melt being poured. Pouring with the electric power on and with continuous stirring yields a higher melt temperature than if the power is off. The higher temperature is desirable, because the solubilities of gases used in this process are generally lower at higher temperatures. Residual gas in the melt leads to undesired properties in the cast refractory, such as low density and increased exudation tendency. However, if the electric power is on during pouring, but without continuous gas injection and the resultant stirring, the temperature of the melt can become so high that the organic binders, which are typically used in making the molds, decompose into gaseous reaction products, again leading to refractory products of decreased density and exudation tendency.

The relative simplicity and low cost of a tuyere make it possible to treat the fusion-casting melt with gas in a substantially continuous manner throughout a production campaign, while also supporting the gas injection between campaigns. Support between campaigns is necessary, because terminating a production campaign by causing a substantial amount of the melt to solidify in the crucible by decreasing or shutting off the electric power can lead to solidification of residual melt about the tuyere. This can immobilize the tuyere and prevent its regeneration upon start-up of the next campaign.

The invention, including the manner and means by which it can be practiced, will be clarified by reference to the drawings, which illustrate preferred embodiments, and to the detailed description which follows.

DETAILED DESCRIPTION

Figure 1:
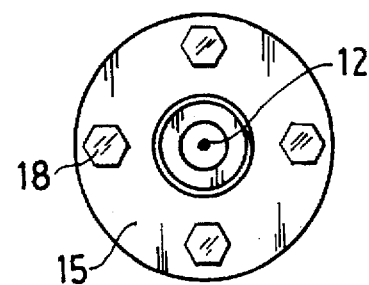
FIG. 1 is a top plan view of a preferred tuyere assembly employed in this invention.

The process of this invention provides means for continuously treating the melt in a fusion-casting furnace with a beneficiating agent throughout a production campaign and for supporting the treatment between campaigns. Although agents other than gases could be used, the beneficiating agent employed in this invention is a gas. Beneficiating gases other than oxidizing gases can be employed according to this invention, e.g., argon, nitrogen, etc. (see, e.g., U.S. Pat. No. 3,670,061), but it is preferred that an oxidizing gas be utilized. Among the various oxidizing gases, a gas selected from air, oxygen, nitrous oxide, carbon dioxide, and mixtures thereof is known to give good results and is preferred. Among these oxidizing gases, oxygen is especially attractive, because it is cost effective.

To simply accomplish the continuous injection of gas into the melt, the lance which is already well known in the art can be utilized. For example, such a lance, preferably unencumbered with associated cooling, can be inserted down through the surface of the melt to a point beneath the surface where emanation of the gas bubbles is desired, e.g., at that point where the stirring associated with the bubbling gas is most effective.

However, according to the instant invention, continuous injection of gas into the melt is achieved by employing as the injector at least one appropriately designed tuyere which, for purposes of this invention, is distinguished from the "lance" currently used in this art by being inserted through the wall of the crucible or ladle. Historically, a tuyere is a device through which a stream of gas is delivered to a furnace, e.g., a hearth or a blast furnace. Tuyeres can be produced in a myriad of different designs, depending upon the furnaces they must interface with, the type of gas to be injected, the nature of the medium in contact with the tuyere, its temperature, etc.

A tuyere can be inserted at any point through the wall of the melt-containing crucible, preferably beneath the surface of the melt. In many instances a single tuyere will suffice, but a plurality of tuyeres can be used effectively in crucibles of large capacity, or, for example, if it is desired to inject more than one kind of gas into the melt. A preferred point of insertion for a tuyere is at or near the bottom of the crucible for delivery of the gas within the projected electrode triangle, i.e., the triangle created by mentally joining the tips of the three electrodes commonly employed for melting the ceramic material and projecting the resultant triangle downward through the melt.

When a tuyere is so-inserted into the crucible, and a substantial amount of the melt is caused to solidify, signaling termination of the production campaign, the tuyere may become frozen into the ceramic material. This can lead to tuyere failure; that is, the gas flow through the tuyere very often fails to regenerate at the start of the next campaign when the ceramic material is remelted. Consequently it has been found desirable to provide means for supporting the gas injection between campaigns, thereby ensuring that gas will be available for substantially continuous injection during subsequent campaigns.

There are several ways in which the gas injection can be supported between campaigns. For example, the tuyere can include refractory metal (listed hereinbelow). If properly designed, such tuyeres can survive being frozen into the ceramic material and the gas flow from them can be satisfactorily regenerated for several campaigns, thereby supporting gas injection between campaigns, even if the electric power is turned off, especially if the tuyere orifice projects above the skull which develops. However, tuyeres made of refractory metal can be quite expensive.

Alternatively, gas injection can be supported between campaigns by simply "idling" the furnace, i.e., by decreasing the electric power so as to minimize the pool of melted ceramic material and continuing the gas flow through the tuyere and the minimized pool. In other cases, especially if the tuyere is readily accessed and relatively inexpensive, it is feasible to terminate the campaign by turning the power off, causing the melt to solidify in the crucible, and replacing the tuyere between production campaigns. This latter technique for supporting the gas injection between campaigns is described in detail hereinafter. Tuyere replacement between campaigns ensures that the gas injection will be regenerated for the next campaign and so is preferred.

If the tuyere is properly designed and inserted through the crucible wall at an appropriate point, it has been found unnecessary to provide cooling for the tuyere. However, aside from the extra complexity and expense, there is nothing to preclude cooling the tuyere if necessary, and the design of such a tuyere is within the skill of those working in this art. If cooling is required, it is preferable that water be avoided as the heat transfer medium for the reasons set forth hereinabove. Rather, another heat transfer medium, preferably one which is a fluid at the tuyere operating temperature, can be employed, and a closed pressurized system can be devised if required by the vapor pressure or reactivity of the chosen fluid. Suitable heat transfer media include, for example, molten aluminum, bismuth, boron, cerium, cobalt, copper, germanium, lanthanum, manganese, nickel, silicon, tin, and combinations thereof.

It will be evident to those skilled in the art that the specifics of the tuyere design are not critical and that many different designs will be effective. A preferred tuyere with associated mounting hardware for use in this invention appears in FIGS. 1 and 2. This tuyere is sufficiently elementary in design that, constructed of relatively inexpensive materials, it can be sacrificed after each production campaign and replaced with a fresh tuyere for the next campaign if necessary. Alternatively, constructed with refractory metal, a tuyere of this design can be employed for a number of production campaigns.

With reference now to the Figures, tuyere assembly 10 includes crucible pipe 19 which carries threads 20 on one end thereof to mate removably with a complementary passage through crucible wall 31. Crucible pipe 19 is welded at its other end to crucible flange 15. Insert pipe 13 is joined by weld 14 to delivery tube 11 and extends through crucible pipe 19, the inner diameter of which is larger than the outside diameter of insert pipe 13. Insert pipe 13 is welded to tuyere flange 16 and terminates in tail pipe 17. Tuyere flange 16 is removably coupled to crucible flange 15 by means of bolt/nut combinations 18. The beneficiating gas is fed into tail pipe 17.

It should be noted that the beneficiating gas exits delivery tube 11 at orifice 12, which lies above or at the surface 39 of refractory residue or skull 34 as explained hereinafter. In operation, tail pipe 17 is connected to a source of gas handling apparatus, including means to adjust the gas pressure, but this is not shown for the sake of simplicity and is well known to those skilled in the art.

The tuyere assembly can be constructed from any of a number of different materials or combinations thereof. For example, ceramics, such as alumina, and metals, such as stainless steel, or refractory metals, such as molybdenum, iridium, niobium, osmium, rhenium, tantalum, tungsten, and combinations thereof can be employed. Among these materials, stainless steel, e.g., 300 series stainless steel, is least expensive and so is preferred. If delivery tube 11 is constructed of commercially available stainless steel microtubing, that portion of delivery tube 11 between orifice 12 and surface 39 of the skull is usually consumed during a production campaign, so that delivery tube 11 then terminates, and orifice 12 is located, at surface 39. It is most convenient and cost effective to also use stainless steel for insert pipe 13, but the choice of these and the other materials is not critical. It will be evident that additional tuyeres can be constructed and inserted through the crucible wall 31 if desired.

The gas flow rate can be controlled at the source, by considering the system geometry, properties of the melt, and the gas being used. Sufficient treatment of the melt can be achieved over a range of gas flow rates.

Figure 2:
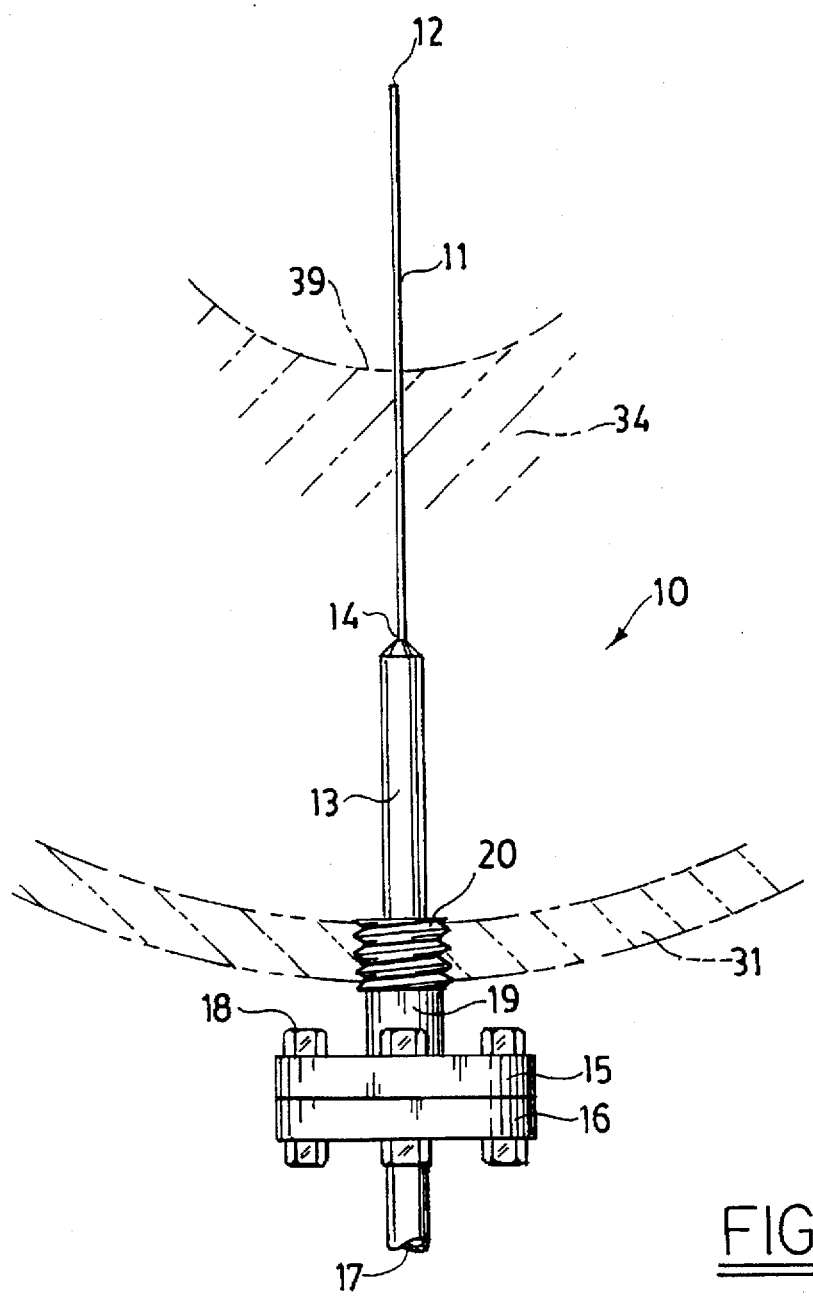
FIG. 2 is a side view of the tuyere assembly of FIG. 1 in combination with part of a furnace, which is shown in phantom line and cross section, employed in practicing the invention.

The specific nature of the means by which tuyere assembly 10 is mounted within crucible wall 31 is not critical, but it is preferred that the mount be designed so that the tuyere assembly is readily removed and replaced. FIG. 2 illustrates one way in which this can be done as described hereinbelow.

The last batch in a fusion-casting production campaign generally concludes by pouring the last melt from the crucible into one or more molds and then causing a substantial amount, which can include all, of the melt to solidify in the crucible by turning the electric power and the gas flow off. This action generally plugs orifice 12 if it is below the surface of the ceramic material. An alternative is to leave the gas flow on and simply idle the furnace between production campaigns as explained hereinafter.

If the orifice 12 of delivery tube 11 is plugged, then prior to start-up of the next production campaign, insert pipe 13 can be twisted by turning tuyere flange 16 after removing fasteners 18. This generally results in breaking delivery tube 11 from insert pipe 13 at weld 14, especially if delivery tube 11 is constructed of stainless steel microtubing. Insert pipe 13 and any remnant of delivery tube 11 can then be withdrawn from the crucible. Insert pipe 13 and the rest of the withdrawn components can be reconditioned as necessary and reused.

The passageway leading from the resultant hole in crucible wall 31 through skull 34 can then be mined out, preferably by first removing crucible pipe 19 and attached crucible flange 15 from crucible wall 31. This is made relatively easy if at least part of the skull or crucible lining surrounding insert pipe 13 and delivery tube 11 is constructed of scrap refractory tile. This type of lining does not melt during the course of the production campaign, so that the passageway for insert tube 13 and delivery tube 11 is substantially preserved from one production campaign to the next. A water-cooled, optionally diamond-tipped drill can be effectively employed to mine out the refractory skull. The cooling water will evaporate upon contacting the skull if it is still hot from the previous campaign.

A fresh insert pipe 13 with delivery tube 11 can then be inserted, ceramic materials added to the crucible, the power turned on, etc. Of course, if delivery tube 11 is not plugged by the solidified charge from the previous campaign, the tuyere assembly can remain in place and be reused. This can be the case if the tuyere includes refractory metal, especially when delivery tube 11 projects above skull 34.

Figure 3:
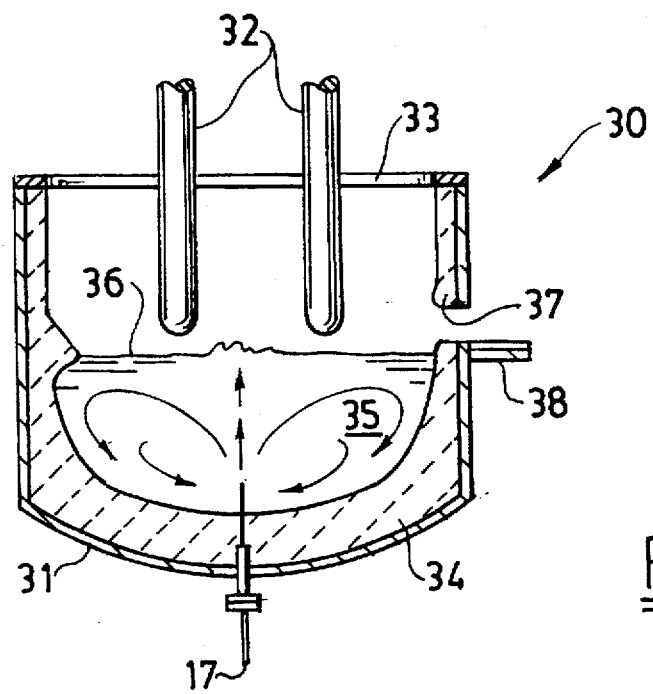
FIG. 3 is a diagrammatic side view of a charged fused-cast refractories furnace of this invention, partially in cross section, at a certain stage in a production batch.
Figure 4:
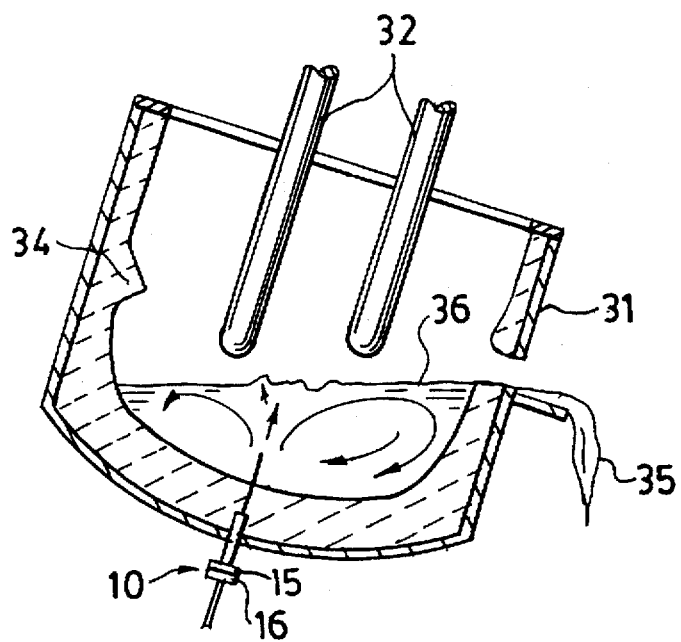
FIG. 4 is a view like FIG. 3, but at a later stage in the production batch.

Attention is now directed to FIGS. 3 and 4, which illustrate application of the invention during a typical fused-cast refractory batch process carried out in furnace 30. The furnace is equipped with a rim 33, but a full cover is not required. Furnace 30 is of the type well known to those skilled in the art, and various components of the furnace, such as cooling for the crucible, the suspension assembly for electrodes 32, etc. are omitted for the sake of clarity. The electric power will generally be 3-phase AC, with three electrodes, one being hidden from view behind another in FIGS. 3 and 4. Preferably, the electrodes are independently suspended, their longitudinal positions with respect to melt surface 36 being controlled automatically to maintain constant current phase to phase.

Furnace 30 can be designed such that the tuyere, or tuyeres, enter(s) crucible wall 31 at any point, provided that orifice 12 of at least one gas delivery tube 11 is beneath the surface of the melt to be produced. This is preferably done by locating tuyere assembly 10 at or near the bottom of crucible 31 as shown in FIGS. 3 and 4. That is, gas delivery tube 11 and insert pipe 13 of tuyere assembly 10 are passed through crucible wall 31 and skull 34 at the bottom of the crucible as shown in FIG. 2. However, it will be appreciated that the tuyere could be introduced through a side or a cover, if present, of the crucible and still so locate gas orifice 12.

With the tuyere assembly 10 in place and furnace 30 upright as shown in FIG. 3, the first batch of the production campaign is begun by starting the passage of beneficiating gas into the crucible space just above skull 34, energizing electrodes 32 to create an electric arc, and adding the desired ceramic materials to the crucible, although one or the other or both of the first two acts can be carried out after the ceramic powder is added, if desired. The charge in the crucible is melted, and throughout the melting process and thereafter the flow of gas into melt 35 is maintained, thereby both stirring and treating melt 35 with the gas. During this process, the entering gas stream causes a rolling/stirring effect in the melt which is illustrated diagrammatically in FIGS. 3 and 4.

After the charge in the crucible has been so-melted, the crucible is tipped as shown in FIG. 4, using means not illustrated, so that melt 35 enters tap hole 37 and issues from spout 38 into molds or other shaping devices (not shown) of the desired size and shape. During this entire set of process steps, the gas flow through tuyere assembly 10 is substantially maintained; the electric power to electrodes 32 may or may not remain on as desired. Upon completion of the pour, the crucible is righted, and any residual melt in the crucible continues to be treated with the gas. Introduction of additional ceramic materials to the crucible begins the next batch in the campaign. These processing steps are repeated for the number of batches required to complete the production campaign, the gas flow through tuyere assembly 10, and preferably the electric power, being maintained throughout the campaign. At the end of the campaign, the gas and electricity can be turned off, or the furnace can be "idled" by decreasing the electric power, but maintaining a small liquid pool about the tuyere and optionally continuing the gas flow so as to support the gas injection between campaigns.

The practice of this invention is more specifically illustrated in the following Examples, Example 1 being a series of two production campaigns for the manufacture of an alumina/zirconia/silica refractory product carried out using the process of this invention, the gas injection being supported between campaigns by replacing the tuyere. It will be evident from the aforesaid discussion that the gas injection can be supported between campaigns by other means if desired. Examples 2 and 3 illustrate production campaigns for the manufacture of the same refractory product but employing processes and apparatus of the prior art.

The results of the three experiments are presented in Tables I–IV, which contain data from individual batches within each production campaign. Tables I and II present comparisons of melt temperature and composition uniformity, while Tables III and IV present comparisons of the fused-cast refractory products in terms of oxidation level and exudation tendency, respectively.

The melt temperatures which appear in Table I are measured using a pyrometer directed at the melt streams being poured into molds; a relatively high and, especially, uniform melt temperature is desired from batch to batch and within the pours from a given batch.

The zirconia contents of individual test cones obtained during several batch pours within each production campaign appear in Table II. In each case, the zirconia content of the cone is determined by methods familiar to those skilled in the art. Uniformity of the zirconia content in the cones, without a trend over the campaign, is desirable.

The data presented in Table III are measures of the state of oxidation of the ceramic material in sample cones obtained during several batch pours within each production campaign. The colors of the cones are compared against a series of standard colored cones ranging from gray (unoxidized) with a rating of "1" to cream colored (completely oxidized) with a rating of "10". The ratings obtained from the pours within a given production campaign are averaged to obtain the ratings which are presented. A high number is desirable in this test.

A standard method, i.e., ASTM C1223-92, is employed to produce the exudation ratings which appear in Table IV. The method measures the percent volume increase of a standard sample caused by exudation of a glassy phase. In this test, a smaller number is desirable.

EXAMPLE 1

Production Campaigns According to This Invention

A fusion-casting furnace is employed which includes an open-top crucible 10 feet in diameter, equipped with a tap hole and pouring spout, crucible cooling and tipping apparatus, and a suspension assembly for three graphite electrodes powered by a conventional arc furnace transformer, the electrodes being independently suspended, their longitudinal positions being controlled automatically to maintain constant current phase to phase. The crucible contains a fresh stainless steel tuyere as illustrated in FIGS. 1–4. A source of oxygen gas is connected to the tuyere assembly, and the flow of oxygen through the tuyere is initiated at a rate of 1.25 SCFM, which rate is maintained throughout the production campaign.

The crucible is next loaded with a batch of ceramic material consisting of alumina, zirconia and silica. The electric power is then turned on, melting the ceramic material. After about an hour, the first pour is made with the electric power remaining on during the pour; the crucible is reloaded with ceramic material, melted, poured, etc. repetitively. During the campaign, "power on" pours are made and new batches started each hour. At the end of the five day campaign the electric power and oxygen gas are turned off, causing the melt to solidify to a skull in the crucible.

Two days after terminating the aforesaid campaign, insert pipe 13 is rotated slightly with a wrench, and the components of the used tuyere are removed from the crucible through the hole in the crucible wall. A pneumatic drill is then connected over the hole in the crucible, and a clear passageway is drilled up completely through the skull. A fresh tuyere of the desired length and diameter is inserted into the hole in the crucible wall and secured as illustrated in the Figures.

The next production campaign is initiated by loading the crucible with a batch of alumina, zirconia and silica ceramic material. The electric power is turned on to strike the arc, melting the ceramic material; the melt is poured into molds, the crucible reloaded, etc. until the campaign is completed.

EXAMPLE 2

Production Campaign Using a Water-Cooled Lance

A fusion-casting furnace like that described in Ex. 1, is employed, except that the crucible is not equipped with a tuyere assembly for injecting oxygen, but instead is equipped with a submersible water-cooled copper lance which can be inserted into the melt from the top of the crucible. The furnace is loaded with the same ceramic materials employed in Ex. 1, and the ceramic materials are similarly melted and poured, the crucible reloaded, etc. in batches lasting one hour. However, in this experiment, at the end of each melt cycle, the electric power is turned off, and the lance is inserted into the melt, whereupon oxygen is injected through the lance, into the melt, at a rate of 15SCFM for approximately 4 minutes. After lance extraction, the melt is allowed to degas for 2–3 minutes and then poured.

EXAMPLE 3

Production Campaign Without Oxygenation

A furnace like that described in Exs. 1 and 2 is employed, using the same ceramic materials and amounts, with a one hour batch cycle time during the campaign. However, in this experiment, the melt is not oxygenated, and the pours are made with the electric power turned off.

TABLE I

Melt Temperature Measurements Within A Batch

| Casting | Melt Temperature (°C.) | | |
|---|---|---|---|
| Sequence | Ex. 1 | Ex. 2 | Ex. 3 |
| 1 | 1859 | 1789 | 1839 |
| 2 | 1851 | 1762 | 1817 |
| 3 | 1850 | 1744 | 1791 |
| 4 | 1857 | 1751 | 1800 |
| Average | 1854 | 1762 | 1812 |
| Range | 9 | 45 | 48 |

TABLE II

Zirconia Content

| Parameter | Ex. 1 | Ex. 2 | Ex. 3 |
|---|---|---|---|
| No. of Samples | 8 | 6 | 8 |
| Average wt % $ZrO_2$ | 34.6 | 34.1 | 34.2 |
| Maximum wt % $ZrO_2$ | 34.9 | 34.4 | 34.6 |
| Minimum wt % $ZrO_2$ | 34.3 | 33.6 | 33.8 |
| Std. Deviation | 0.19 | 0.27 | 0.42 |
| Last wt % $ZrO_2$[a] | 35.4 | na | 42.8[b] |

[a] Typical $ZrO_2$ content of last pour in campaign.
[b] High value due to increased sedimentation in the unstirred melt.

TABLE 3

Oxidation Ratings of Refractory Products

| Ex. 1 | Ex. 2 | Ex. 3 |
|---|---|---|
| 10 | 8.3 | 8.0 |

TABLE 4

Exudation Ratings of Refractory Products

| Ex. 1 | Ex. 2 | Ex. 3 |
|---|---|---|
| 1.92% | 2.25% | 2.34% |

Although this invention has been illustrated with reference to specific embodiments thereof, the invention is limited, not to those embodiments, but only by the scope of the following claims:

What is claimed is:

1. In a process for manufacturing a fused cast refractory product, said process including a series of at least, two production campaigns, each campaign comprising a batch-wise process carried out at least once, said batch-wise process including the steps of (1) loading a walled crucible of an electric arc furnace with ceramic material, (2) melting the ceramic material by powering the electric arc, (3) treating the melted ceramic material with a beneficiating gas, and (4) pouring the treated melt into one or more molds, each campaign being terminated by causing a substantial amount of the melt to solidify in the crucible, the improvement therein which comprises:

injecting said beneficiating gas upwardly, through the bottom of said crucible, beneath the surface of the melt in a substantially continuous manner throughout each production campaign from at least one tuyere mounted on the outside of the bottom wall of said crucible and inserted through the bottom of said crucible beneath the surface of the melt thereby continuously stirring the melted ceramic material and whereby power to said electric arc can be maintained during said step of pouring;

wherein said beneficiating gas is selected from the group consisting of oxidizing agents;

terminating said campaign by removing power to the electrode means thereby allowing the melted ceramic material to solidify;

removing at least one previously used tuyere from the bottom of said crucible;

drilling out said previously used tuyere within said crucible and through any solidified ceramic material encompassing said used tuyere;

reattaching the removable portion of a new tuyere to the bottom of said outer crucible wall; wherein said steps of terminating, removing, drilling and reattaching are repeated between campaigns.

2. The process of claim 1 wherein the portion of the crucible contents is mined out with a water-cooled drill inserted through the bottom of said crucible wall.

3. The process of claim 1 wherein said oxidizing gas is selected from the group consisting of oxygen, air, nitrous oxide, carbon dioxide, and mixtures thereof.

4. The process of claim 3 wherein said oxidizing gas includes oxygen.

5. The process of claim 1 wherein at least one tuyere is inserted through the bottom wall of said crucible a distance sufficient to penetrate through any solidified refractory residue lining the interior of said crucible.

6. The process of claim 1 wherein a single tuyere is employed.

7. The process of claim 6 wherein said electric arc furnace provides electrode means for creating an electric arc near the surface of the ceramic material and said tuyure is inserted into the bottom of said crucible to deliver said beneficiating gas within the area projected by said electrode means.

8. The process of claim 1 wherein the improvement further comprises powering the electric arc continuously throughout at least one batch in at least one campaign.

9. The process of claim 1 wherein at least one tuyere is free from any cooling means.

10. The process of claim 9 wherein the ceramic material comprises a mixture of alumina, zirconia and silica.

11. The process of claim 1 wherein the ceramic material is selected from the group consisting of silica, alumina, zirconia, calcia, chromia, magnesia, alkali metal oxides, chrome ores, zircon, and mixtures thereof.

12. A process for manufacturing a fused-cast refractory product which comprises (1) providing an electric arc furnace which includes a walled crucible for containing ceramic material, electrode means for creating an electric arc near the surface of the ceramic material, means for powering the electric arc to melt the ceramic material, a tuyere assembly providing a removable portion mounted on the outside of the bottom wall of said crucible and a delivery tube inserted through the bottom of said crucible for injecting a beneficiating gas, selected from the group consisting of oxidizing agents, beneath the surface of the melt, and means for pouring the melt into molds;

(2) completing a production campaign by (a) loading said crucible with ceramic material;

(b) powering the electric arc and melting the ceramic material;

(c) injecting the gas upwardly, through the bottom of said crucible, in a substantially continuous manner;

(d) pouring the melted ceramic material into one or more molds without withdrawal of said tuyere from said crucible, or terminating said electric arc, whereby said step of injecting can be maintained;

(e) repeating steps (a) through (d) as necessary to complete the production campaign;

(3) terminating said campaign by removing power to the electrode means and allowing the melted ceramic material to solidify;

(4) removing at least one previously used tuyere assembly from the bottom of said crucible;

(5) drilling out said previously used tuyere assembly within said crucible and through any solidified ceramic material encompassing said used tuyere assembly;

(6) reattaching the removable portion of a new tuyere assembly to the bottom of said outer crucible wall; and (7) repeating step (2) at least once.

13. The process of claim 12 wherein the portion of the crucible contents is mined out with a water-cooled drill inserted through the bottom of said crucible wall.

14. The process of claim 12 wherein said oxidizing gas is selected from the group consisting of oxygen, air, nitrous oxide, carbon dioxide, and mixtures thereof.

15. The process of claim 14 wherein said oxidizing gas includes oxygen.

16. The process of claim 12 wherein at least one tuyere is inserted through the bottom wall of said crucible a distance sufficient to penetrate through any solidified refractory residue lining the interior of said crucible.

17. The process of claim 12 wherein said electric arc furnace provides electrode means for creating an electric arc near the surface of the ceramic material and said tuyere is inserted into the bottom of said crucible to deliver said beneficiating gas within the area projected by said electrode means.

18. The process of claim 12 wherein at least one tuyere is free from any cooling means.

* * * * *